United States Patent [19]
Manzke

[11] 3,858,405
[45] Jan. 7, 1975

[54] REMOVABLY POSITIONED REFRIGERATED CHEST FOR MOTOR VEHICLES

[76] Inventor: Walter R. Manzke, 13601 Jackrabbit Rd., Poway, Calif. 92064

[22] Filed: Oct. 26, 1973

[21] Appl. No.: 410,087

[52] U.S. Cl............... 62/196, 62/243, 62/337
[51] Int. Cl............................ F25d 23/12
[58] Field of Search ........... 62/196, 243, 244, 299, 62/323, 199, 200, 337

[56] References Cited
UNITED STATES PATENTS

| | | | |
|---|---|---|---|
| 2,495,350 | 1/1950 | Smith | 62/243 |
| 2,902,838 | 9/1959 | Nichols | 62/337 |
| 3,315,487 | 4/1967 | Heaton | 62/243 |
| 3,719,058 | 3/1973 | Waygood | 62/243 |

*Primary Examiner*—Meyer Perlin
*Attorney, Agent, or Firm*—Brown & Martin

[57] ABSTRACT

A cooling element that is positioned in the trunk of a vehicle and cooled by the existing air conditioning system of the vehicle, which element is enclosed by an insulated chest that may be selectively inserted or removed from the trunk of the vehicle, and refrigerates the air in the chest. Manual control valves and automatic temperature control valves control the temperature of air refrigeration in the chest and the chest may also include a temperature controlled vent for admitting air from the outer environment into the chest to maintain desired air temperatures therein.

5 Claims, 4 Drawing Figures

Patented Jan. 7, 1975　　　　　　　　　　　　　　　　　3,858,405
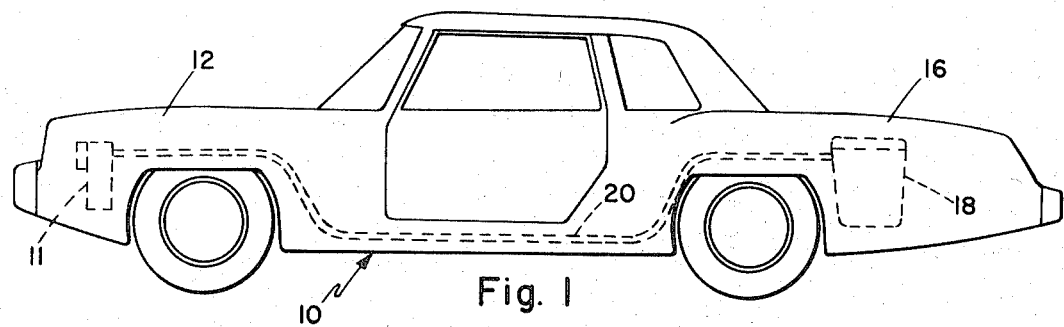
Fig. 1
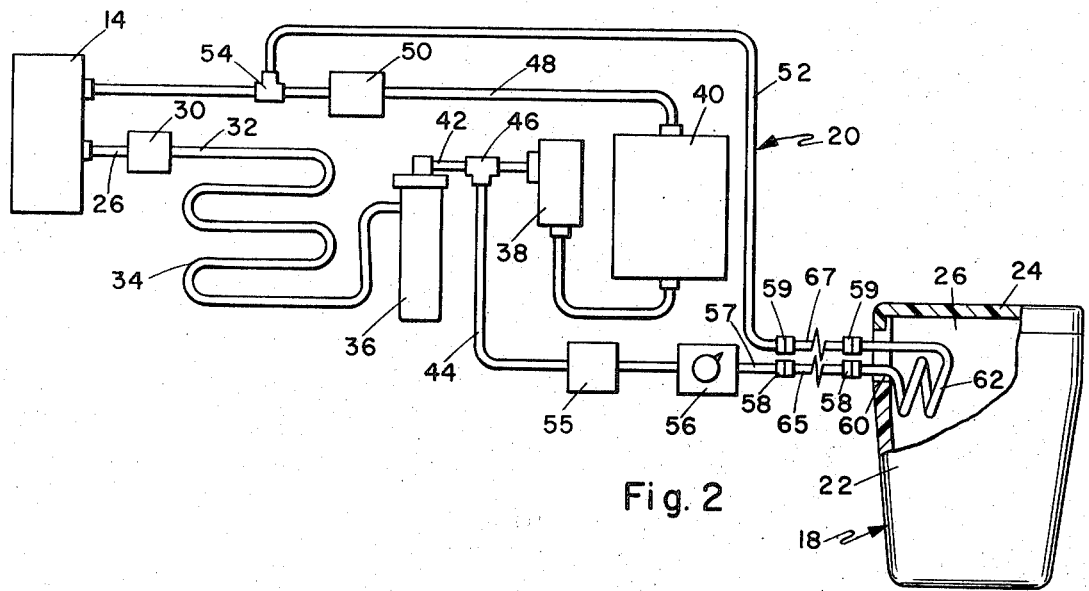
Fig. 2
Fig. 4
Fig. 3

REMOVABLY POSITIONED REFRIGERATED CHEST FOR MOTOR VEHICLES

BACKGROUND OF THE INVENTION

Thre is normally no provision in motor vehicles, other than in elaborate campers and in motor homes, for the refrigeration of products such as food and beverages. Yet there are many occurrences where it is desirable to have a refrigerating unit, such as on family outings, trips, fishing or hunting expeditions, or the like. So it is normally necessary to place in the vehicle, an ice chest that is filled with ice or a pre-refrigerated element. The use of an ice chest has many disadvantages. The ice is normally difficult to handle, takes up a considerable amount of room in the chest and then melts causing water to slosh around in the container. While frozen refrigerating elements may be used until they still lose their coldness, such units do not provide continuous uniform cooling temperatures and occupy considerable space within the ice chest. However the use of a separate ice chest does have the advantage of being easily removable from the vehicle.

Most vehicles now have air conditioning systems. Such air conditioning systems have large capacities that are usually far in excess of that required to cool the vehicle under normal circumstances. Thus it is an advantage of this invention to utilize a part of this existing air conditioning capacity to provide a refrigerated chest for carrying foods, beverages, and the like in the motor vehicle while only using simple and relatively inexpensive structures, that allows the continuous cooling of an insulated chest compartment that is easily and quickly removable from the vehicle and does not have the disadvantage of requiring use of separate frozen elements for cooling the refrigerated chest or compartment.

SUMMARY OF THE INVENTION

In a preferred embodiment of this invention, the refrigerating unit is mounted inside an automotive vehicle, preferably in the trunk or some other suitable compartment. The vehicle has a generally known air conditioner system with a compressor and a primary fluid carrying conduit for carrying the coolant fluid from the compressor through cooling coils and through an expansion valve and a cooling evaporator and back to the compressor, often through a suction throttling valve. A cooling element that is mounted in the particular compartment where the refrigerated chest is to be located, is connected to pass coolant fluid through secondary and separate conduit means that are interconnected with the automobile's air conditioning system to tap off coolant fluid from the primary conduit between the condenser and the expansion valve, and that returns the coolant back to the return line to the compressor. The cooling element projects into the compartment and is enclosed by a removable insulated refrigerating chest. Thus the cooling element cools the chest and keeps cool the product therein, such as food, beverages, fish or the like. The coolant fluid is expanded through a separate expansion valve orifice in the input secondary conduit to the cooling element. Thus the coolant is expanded only at the immediate location of the cooling element. Manual valves are provided in the line that control the coolant flow through the cooling element and may be calibrated to provide a given air temperature in the chest. Since any of several varieties of cooling chests with different insulations may be used to enclose the cooling element, the manual temperature control valve generally has to be calibrated for each cooling chest. Accordingly it is within this invention to control the coolant flow through a thermostat control valve with a thermostat element being positionable within the chest. Additionally, the chest may have a vent with a temperature control valve element for controlling flow of air from the outer environment into the chest to maintain a given air temperature within the chest. This vent valve member may be operated by a bi-metallic temperature sensitive element.

Thus it may be understood that the chest may be filled to virtually its capacity and then inserted into the trunk of the vehicle with the refrigerating element passing through the upper recess and the top of the chest being closed by a normal cover that is notched to permit the secondary coolant conduit to pass therethrough. The chest may be easily and quickly removed and taken to the beach or some other point of use of the contents, and may be easily and cheaply replaced if damaged.

It is therefore an object of this invention to provide a new and improved structure and arrangement for providing a refrigerated compartment in a motor vehicle, which compartment is easily and quickly removed from the vehicle and does not have its own cooling system.

FIG. 1 is a side elevation view of a vehicle, illustrating a typical installation of the refrigeration system.

FIG. 2 is a diagram of the system of this invention.

FIG. 3 is similar to a portion of FIG. 2 but illustrates an alternative thermostat control.

FIG. 4 is an enlarged view of the chest, partially cut away to show a thermostatically controlled vent.

Referring now to the drawing, a typical vehicle 10 has a trunk compartment 16 and an engine compartment 12. An air conditioning unit 11 is provided with a duct system (not shown) for cooling the internal passenger compartment of the vehicle. However such systems do not normally air condition the trunk compartment 16 of the vehicle.

As illustrated in FIG. 2, the typical air conditioning system comprises a compressor 14 that is driven by the motor vehicle's engine. The compressor 14 compresses a coolant, such as Freon or the like, to a substantially liquid condition that passes out through line 26, through a muffler 30, and through line 32 through a cooling coil arrangement or condenser 34 in which the temperature of the coolant liquid is reduced. The coolant then passes through a receiver-dehydrator 36 and through line 42 and through T connector 46 to an expansion valve 38. The coolant expands in expansion valve 38 reducing its temperature, which coolant then passes into the evaporator 40 that cools the air passing therethrough and into the passenger compartment of the vehicle 10. The coolant is then returned via line 48 and through a suction throttling valve 50 and through T connector 54 to the input side of the compressor 14 for recycling. It may be understood that the cooled coolant in condition for expansion to reduce its temperature is passed through T connector 46 and the expanded coolant is passed through T connector 54.

A secondary conduit means 20 comprising a conduit similar to the primary conduit 26, 32, and 48, conducts compressed coolant from T connector 46 through an expansion orifice 55, through a temperature control valve 56, through secondary conduit 57, and through connectors 58 and flexible line 65 to a cooling element or cooling coil 62 that functions as an evaporator. The coolant after passing through the cooling element 62 then passes through connectors 59 and flexible line 67, through line 52 and through T connector 54 to the return line of the compressor 14. The secondary conduit means or conduit 20 passes through the vehicle or underneath the vehicle to position the cooling element 62 in the trunk compartment 16 of the vehicle 10. The flexible lines 65 and 67 allow the cooling element 62 to be moved around in the trunk compartment for fitting into the chest 18.

A chest 18, which may be a plastic foam ice chest or other suitable insulated container having an upper opening with a lid 24, is maneuvered to position the cooling element 62 in the enclosed volume 26 of the chest 18. It may be observed and understood that the chest 18 is easily and quickly removed from the trunk compartment and may be filled with any products that are desired to be refrigerated and then positioned in the trunk compartment where the products are cooled. The chest and products may be then quickly and easily removed at the destination with the cooling element 62 cooling the internal volume 26 of the chest during the vehicle trip. The opening 60 may either be in the side wall of the bottom portion 22 of the chest 18 or in the side of the lid 24. However the cooling element 62 only occupies a relatively small portion of the volume 26 of the chest 18.

The temperature control valve 56 is essentially a manually controlled valve that controls the amount of coolant passing to the cooling element 62. By successive test, the valve unit 56 may be calibrated to provide a given temperature within the compartment 26, as the amount of coolant passing through the secondary conduit 20 is separate from the air conditioning system of the vehicle. As an additional temperature control, illustrated in FIG. 3, fluid control valve 64 may be controlled by a thermostatic unit within the valve structure 64 in response to a temperature probe 66 connected by line 68, which temperature probe 66 is easily inserted into the chest such as by pushing the temperature probe 66 through a hole in the side of the chest. Additionally, the chest 18 may have in the side wall of the lower compartment 22, a recess 82, as in FIG. 4. A bi-metallic operated valve member 80 has a bi-metallic member 88 held in position by clasp 86 with a plug 84 for closing recess 82 attached thereto. The bi-metallic element 88 closes the recess 82 in response to temperature changes and removes the plug 84 from recess 82 in reponse to temperature changes, thus allowing ambient air to be vented into the compartment to provide temperature control within the compartment, irrespective of the coolant flow through the cooling coil 62.

When it is not desired to use the refrigerating system in the trunk compartment, then valve 56 is manually closed preventing coolant from flowing in the system.

Having described my invention, I now claim:

1. In a refrigerating unit for being positioned in a vehicle such as in the trunk, which vehicle has an air conditioning system with a compressor and primary conduits for carrying coolant fluid from the compressor through a condenser and through an expansion valve and through an evaporator back to the compressor, the improvement comprising, a cooling element for being positioned in the trunk of the vehicle, secondary and separate conduit means interconnected with the primary conduit for carrying coolant from the primary conduits at a location between the cooling coils and the expansion valve through said cooling element and back to the primary conduit between the evaporator and the compressor, expansion orifice means in said secondary conduit means for expanding the coolant fluid passing therethrough, chest means for fitting in the trunk and enclosing said cooling element, valve means for controlling the amount of coolant fluid flow through said secondary conduit means, said chest means comprises a chest made of insulating material, said chest having a closable opening for passing said cooling element into said chest, said chest having a vent for admitting air from outside said chest into the internal volume of said chest, and temperature valve means for selectively opening and closing said vent.

2. In a refrigerating unit as claimed in claim 1 wherein, said temperature valve means comprising a bi-metallic temperature controlled flapper valve in which said flapper valve is connected to a bi-metallic temperature element and is moved inwardly and outwardly to open and close said vent with the bending of the bi-metallic element in response to changes in temperature in said chest.

3. In a refrigerating unit for being positioned in a vehicle such as in the trunk, which vehicle has an air conditioning system with a compressor and primary conduits for carrying coolant fluid from the compressor through a condensor and through an expansion valve and through an evaporator back to the compressor, the improvement comprising, a cooling element for being positioned in the trunk of the vehicle, secondary and separate conduit means interconnected with the primary conduit for carrying coolant from the primary conduits at a location between the cooling coils and the expansion valve through said cooling element and back to the primary conduit between the evaporator and the compressor, expansion orifice means in said secondary conduit means for expanding the coolant fluid passing therethrough, chest means for fitting in the trunk and enclosing said cooling element, valve means for controlling the amount of coolant fluid flow through said secondary conduit means, said chest means comprising a plastic foam ice chest having a removable top, one side of said chest adjacent said top being recessed for passing said secondary conduit means into said recess and placing said cooling element in said chest, allowing said top to be fitted in a position with said cooling element in said chest and said secondary conduit means being passed through said recess, and said chest being quickly and easily removable from said trunk.

4. In a refrigerating unit for being positioned in a vehicle such as in the trunk, which vehicle has an air conditioning system with a compressor and primary conduits for carrying coolant fluid from the compressor through a condensor and through an expansion valve and through an evaporator back to the compressor, the improvement comprising, a cooling element for being positioned in the trunk of the vehicle, secondary and separate conduit means interconnected with the primary conduit for carrying coolant from the primary conduits at a location between the condensor and the expansion valve through said cooling element and back to the primary conduit between the evaporator and the compressor, expansion orifice means in said secondary conduit means for expanding the coolant fluid passing therethrough, chest means for fitting in the trunk and enclosing said cooling element, valve means for controlling the amount of coolant fluid flow through said secondary conduit means, said valve means including control valve in said secondary conduit means in the input to said cooling element that selectively controls the amount of cooling fluid flowing through said secondary conduit means, and said control valve having means for selectively calibrating the opening of the valve to a desired temperature in said refrigerating chest means.

5. In a refrigerating unit as claimed in claim 9, including, a temperature responsive means having an element insertable in said chest means for controlling the opening of said control valve to provide a given refrigerated temperature in said chest means.

* * * * *